United States Patent
Enriquez et al.

(10) Patent No.: US 6,950,514 B2
(45) Date of Patent: Sep. 27, 2005

(54) VOLTAGE REFERENCE FILTER FOR SUBSCRIBER LINE INTERFACE CIRCUIT

(75) Inventors: Leonel E. Enriquez, Melbourne Beach, FL (US); Douglas L. Youngblood, Palm Bay, FL (US)

(73) Assignee: Intersil Americas Inc., Milpitas, CA (US)

( * ) Notice: Subject to any disclaimer, the term of this patent is extended or adjusted under 35 U.S.C. 154(b) by 513 days.

(21) Appl. No.: 10/114,733

(22) Filed: Apr. 2, 2002

(65) Prior Publication Data

US 2003/0169872 A1 Sep. 11, 2003

Related U.S. Application Data

(63) Continuation-in-part of application No. 10/091,976, filed on Mar. 6, 2002.

(51) Int. Cl.[7] .......................... H04M 1/00; H04M 9/00; H04M 9/08
(52) U.S. Cl. .................... 379/413; 379/392.01
(58) Field of Search ..................... 379/413–413.02, 379/392.01, 399.01, 401, 402–405

(56) References Cited

U.S. PATENT DOCUMENTS 5,528,688 A * 6/1996 Schorr ........................ 379/413
6,735,302 B1 * 5/2004 Caine et al. ................ 379/405

* cited by examiner

*Primary Examiner*—George Eng
*Assistant Examiner*—Alexander Jamal
(74) *Attorney, Agent, or Firm*—Allen, Dyer, Doppelt, Milbrath & Gilchrist, P.A.

(57) ABSTRACT

A voltage reference filter for a subscriber line interface circuit removes unwanted noise on a DC reference voltage sourced by a device, such as a codec, and employed by the subscriber line circuit as a differential mode voltage baseline. The DC reference voltage is coupled via a high pass filter to the sense amplifier. The filter blocks the DC component of the reference voltage and passes noise components to the sense amplifier. The reference port of an amplifier between the sense amplifier and a codec receives the same (noisy) reference voltage AC-coupled to the sense amplifier, and performs common mode rejection of noise components riding on the DC reference.

16 Claims, 1 Drawing Sheet

US 6,950,514 B2

VOLTAGE REFERENCE FILTER FOR SUBSCRIBER LINE INTERFACE CIRCUIT

CROSS-REFERENCE TO RELATED APPLICATION

The present application is a continuation-in-part of co-pending U.S. patent application Ser. No. 10/091,976, filed Mar. 6, 2002, by L. Enriquez et al, entitled: "Programmable Subscriber Line Circuit Partitioned Into High Voltage Interface and Digital Control Subsections" (hereinafter referred to as the '976 application), assigned to the assignee of the present application and the disclosure of which is incorporated herein.

FIELD OF THE INVENTION

The present invention relates in general to telecommunication systems and subsystems therefor, and is particularly directed to a voltage reference filter enhancement to a subscriber line interface circuit (SLIC) of the type described in the above-referenced '976 application, for removing unwanted noise that may be present on a reference voltage that is sourced by an associated device, such as a codec, and employed by the SLIC as a differential mode voltage baseline.

BACKGROUND OF THE INVENTION

Subscriber line interface circuits (SLICs) re employed by telecommunication service providers to interface a wireline pair with subscriber (voice - data) communication equipment. In order to be interfaced with different types of telecommunication circuits, including (single supply-based) low voltage circuits that provide digital codec functionality, the transmission channels of the SLIC must conform with a very demanding set of performance requirements, such a accuracy, linearity, low noise, filtering, insensitivity to common mode signals, low power consumption, and ease of impedance matching programmability. In a typical application, the wireline pair to which the SLIC is connected can vary from one installation to another, and may have a significant length (e.g., on the order of multiple miles), transporting both substantial DC voltages, as well as AC signals (e.g., voice and/or ringing). As a result, it has been difficult to realize a SLIC implementation having 'universal' use in both legacy and state o the art installations.

Advantageously, this problem is successfully addressed by the SLIC architecture disclosed in the '976 application, referenced above and diagrammatically illustrated in FIG. 1. As shown therein, the SLIC of the '976 application is partitioned into a high voltage analog section 100, that drives tip and ring conductors 11, 12 of a subscriber loop pair 10, and a mixed signal (low voltage and digital signal processing) section 200, which monitors and controls the operation of the high voltage analog section. High voltage analog section 100 is comprised of an integrated arrangement of functional analog signal blocks, and is interfaced with a DSP codec subsection 200C and a supervisory microcontroller subsection 200S of the mixed signal section 200. The high voltage section performs analog (e.g., voice, ringing) signal processing and interface functions of a conventional SLIC, based on control inputs and programmed parameters of the mixed signal section.

Included within the high voltage analog section 100 is a receive input unit 110, which interfaces and conditions voice signals and associated ancillary signals, such as metering tones, supplied from the DSP codec subsection 200C of the mixed signal section 200. In order to perform (codec-) compatible, differential mode signal processing of the signals it interfaces between the codec and the wireline pair, the receive input unit 110 is supplied with a reference voltage REF sourced from the codec. The reference voltage REF is selected in accordance with the available voltage parameters of the codec circuit, and typically has a value midway between the single supply voltage (Vcc) and ground. For reduced voltage circuit applications, such as those operating at value on the order of three volts, the reference voltage REF may correspond to a voltage on the order of 1.5 VDC (midway between Vcc and ground).

The receive input unit 110 is implemented as a voltage-sense, current-feed circuit, to which voice signals from the mixed signal section's codec 200C are applied. A sense resistor 111 is coupled to a voltage reference port 112, to which the reference voltage REF is supplied from the codec. In response to a voice representative voltage signal between the voice signal receiving (VRX) port 113 and the reference voltage port 112, the sense resistor 111 produces a received current signal irx representative of the voice signal. Complementary polarity copies of the received current signal irx are regenerated by a pair of (tip and ring associated) current mirrors 114 and 115, and applied over lines 117 and 118 to respective tip and ring amplifiers 140T and 140R of a dual mode tip and ring amplifier unit 140.

The output of the tip amplifier 140T is coupled to the tip conductor 11, while the output of ring amplifier 140R is coupled to the ring conductor 12 of the wireline pair 10. In addition, the tip amplifier output is coupled to first input 131 of a sense amplifier (SA) 130, and the ring amplifier output is coupled to a second input 132 of sense amplifier 130. The output path of the sense amplifier 130 from an output port thereof includes a series resistor 134 coupled to an output terminal 135.

The output terminal 135 may be coupled through a capacitor CH to the inverting (−) input 151 of a auxiliary external operational amplifier 150, the non-inverting (+) input 152 of which is coupled to the reference voltage REF supplied by the codec. The output 153 of the auxiliary amplifier is coupled to the codec, and may be fed back to an analog feedback monitor (AFM) port 119 of the receive input unit 110. An auxiliary sense resistor 120 is coupled between the voltage reference port 112 and AFM port 119. The AFM port provides the ability to close a loop from the output of the sense amplifier 130 through the auxiliary amplifier 150, in order to synthesize the output impedance of the tip/ring amplifiers.

The parametric values of the sense amplifier resistor 134 and the sense resistors 141T and 141R of the tip and ring amplifiers 140T/140R are defined to effectively track one another with a precise ratio, in the sense of the output transfer function of the tip and ring amplifiers, as coupled to the sense amplifier's voltage detector circuitry. With voltages across the tip and ring sense resistors 141T/141R of the tip/ring amplifiers coupled in complementary-polarity fashion to the voltage detectors of the sense amplifier 130, the sense amplifier's output port 135 will provide a voice signal summation output for differential mode voice signals, whereas common mode signals will mutually cancel.

During AC (voice signal) transmission, the auxiliary amplifier 150 between the sense amplifier output port 135 and the AFM port 119 provides feedback necessary to perform the impedance matching function. This converts the output current through capacitor CH to a voltage, which is fed to the AFM terminal 119 and is a prescribed level (e.g., −6 dB) below the VRX signal, to realize a defined gain for the receive input to tip and ring. In this mode, the tip/ring amplifier unit 140 converts the received voice signal voltage into a differential mode signal at the tip/ring interface. The output of the sense amplifier 130 at port 135 thereby provides the codec with a very precise current proportional to the AC loop current. This current is converted to a voltage, amplified by amplifier 150 and fed to the codec for processing, being injected back into the receive path to produced a prescribed gain from the injection point to the wireline interface.

Unfortunately, the device (here a codec) that sources the reference voltage REF for defining the AC signal reference voltage baseline of the receiver typically contains high frequency switching transients produced within the device, and thereby constitutes an unwanted noise source to the SLIC. Although this is not a problem for the differential mode receiver, it represents a significant impairment to the ability of the auxiliary amplifier 150 feeding the codec to deliver an output voltage precisely proportional to only the AC loop current. When the reference voltage REF is noisy, then that noise will propagate through (and be amplified by) the auxiliary amplifier, and will appear at the input to the codec.

SUMMARY OF THE INVENTION

In accordance with the present invention, this problem is effectively obviated by AC-coupling the reference voltage REF as an additional input to the sense amplifier. This AC-coupling is implemented through the capacitor leg of an auxiliary high-pass, resistor-capacitor (RC) filter, coupled through a buffer amplifier to the signal transport path through which one of the tip/ring signal currents is coupled to an input port of the sense amplifier. The RC filter blocks the DC reference voltage REF, but has a time constant that passes noise components riding on the reference voltage REF to the sense amplifier. The output of the sense amplifier therefore not only includes the desired tip/ring voice signals, but also whatever unwanted noise components may be riding on the reference voltage REF supplied by the codec.

Because the reference port of the auxiliary amplifier is supplied with the same (noisy) reference voltage REF that is AC-coupled to the sense amplifier, the auxiliary amplifier performs a prescribed amount (gain-based) of common mode rejection of the REF noise component contained in the sense amplifier's noise-modified output signal. As a result, when the output of the auxiliary amplifier is further differentially combined with the REF voltage at the input (analog-to-digital converter) end of the codec (which is referenced to the same REF voltage), the two REF voltage noise components may readily cancel one another, so that the codec effectively processes a voltage which is precisely proportional to the AC loop current, as desired.

DETAILED DESCRIPTION

Figure 1:
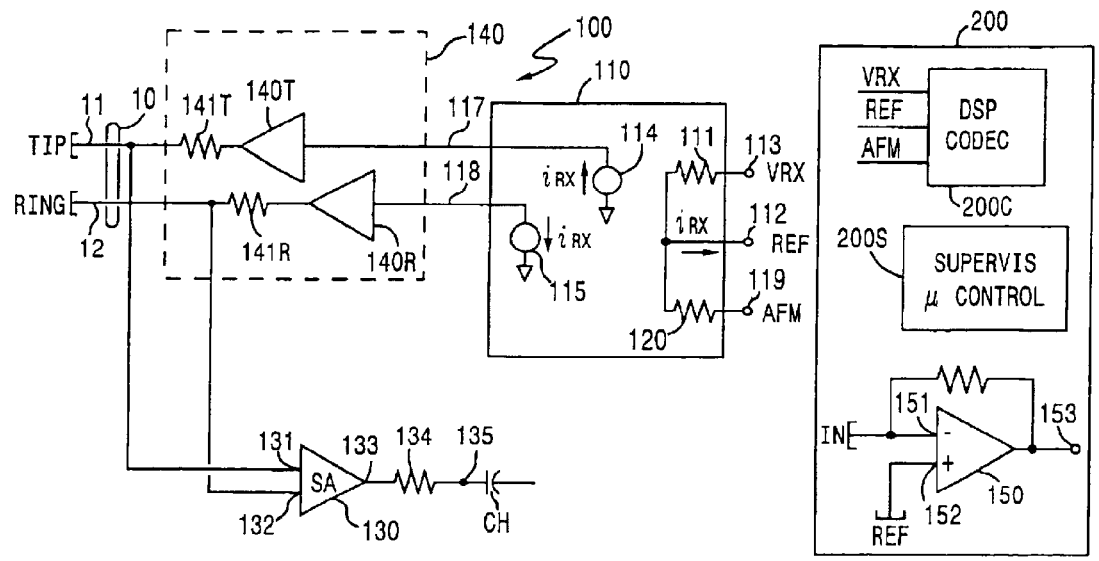
FIG. 1 diagrammatically illustrates the SLIC architecture disclosed in the above-referenced '976 application.
Figure 2:
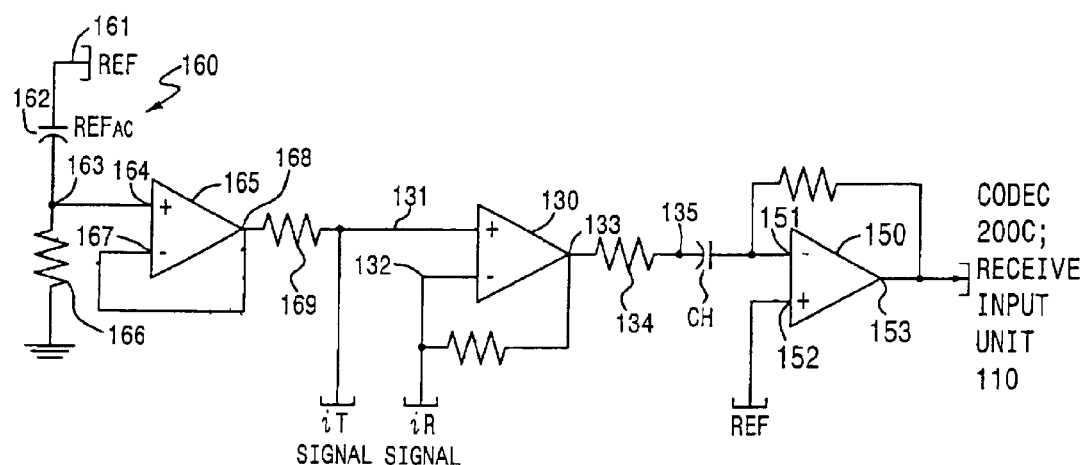
FIG. 2 illustrates the input path of the sense amplifier of the SLIC architecture of FIG. 1 as modified to incorporate a reference voltage-based noise-canceling filter in accordance with the present invention.

Attention is now directed to FIG. 2, which shows the manner in which the input voice signal path of the sense amplifier 130 of the SLIC architecture of FIG. 1 is modified to incorporate the auxiliary, reference voltage-based, noise-canceling, high pass filter of the present invention. As shown therein, an auxiliary high pass filter 160 is coupled between a reference voltage port 161 to which the reference voltage REF is supplied from the codec, and the signal transport path of one of the tip/ring inputs 131/132 of the sense amplifier 130 (the tip input 131, in the illustrated example). The auxiliary filter 160 may be readily implemented as a resistor-capacitor filter, containing a capacitor ($REF_{AC}$) 162 coupled between the reference voltage port 161 and a node 163. Node 163 is coupled to the non-inverting (+) input 164 of a (voltage follower-configured) buffer amplifier 165, and through a resistor 166 to ground. The inverting (−) input 167 of buffer amplifier 165 is coupled to its output 168 and through a resistor 169 to the tip input 131 of the sense amplifier.

The values of the capacitor 162 and resistor 166 of the high pass filter 160 are defined so that the RC filter blocks the DC reference voltage REF, but produce a time constant that passes noise components riding on the reference voltage REF to the sense amplifier 130. The output 133 of the sense amplifier 130 therefore not only includes the desired tip/ring voice signals, but also whatever unwanted noise components may be riding on the reference voltage RE supplied by the codec.

Because the reference port 152 of the auxiliary amplifier 150 is supplied with the same (noisy) reference voltage REF that is AC-coupled to the (tip input 131) of the sense amplifier 130, the auxiliary amplifier performs a prescribed amount (gain-based) of common mode rejection of the REF noise component contained in the sense amplifier's noise-modified output signal. As a result, when the output of the auxiliary amplifier 150 is further differentially combined with the REF voltage at the input (analog-to-digital converter) end of the codec (which is referenced to the same REF voltage), the two REF voltage noise components cancel one another, so that the codec effectively processes a voltage which is precisely proportional to the AC loop current, as desired.

As a result the invention effectively overcomes the problem of unwanted switching transients and other noise that can be expected to be present on a reference voltage REF supplied by signaling circuitry (e.g., codec) to which the SLIC is connected. In effect, noise components that may be present on the reference voltage REF will not appear at the input to the codec.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed:

1. An apparatus comprising:
    an input port to which an input signal is applied;
    an output port from which an output signal is derived;
    a signal processing circuit coupled between said input and output ports, and being operative to process said input signal applied to said input port and to generate said output signal, in accordance with a prescribed relationship between said input signal and a DC reference applied to a reference port of said signal processing circuit, said DC reference being subject to the presence of unwanted noise components; and an AC filter having an input coupled to receive said DC reference and an output coupled to a signal transport path through which said input signal is coupled to said input port, said AC filter having a transfer function that is operative to pass said noise components that may be present on said DC reference to said input port, but to block the DC component of said DC reference from application to said input port;

said signal processing circuit performing common mode rejection of said noise components that may be present on said DC reference, so that said output signal at said output port has substantially reduced noise components which, when coupled to downstream differential mode processing circuitry that is coupled to said DC reference, are effectively canceled, wherein said signal transport path contains an amplifier having a differential pair of inputs coupled to receive a differential signal, and wherein one of said differential pair of inputs is coupled to the output of said AC filter, said amplifier having an output thereof coupled to said input port, and wherein said amplifier comprises a sense amplifier of subscriber line interface circuit, coupled to receive tip/ring signals interfaced with a wireline pair, and wherein said signal processing circuit comprises an operational amplifier having a first input coupled to receive said DC reference from a external device to which said subscriber line interface circuit is coupled, and a second, opposite polarity, input coupled to receive the output of said sense amplifier, said operational amplifier having an output coupled as an input to said external device.

2. The apparatus according to claim 1, wherein said AC filter comprises a high pass, resistor-capacitor filter, containing a capacitor coupled between a DC reference port to which said DC reference is applied and a node, that is coupled through a resistor to a prescribed voltage terminal, and to an input of a buffer, and an output which is coupled to said signal transport path.

3. The apparatus according to claim 1, wherein said external device comprises a codec.

4. The apparatus according to claim 1, wherein said subscriber line circuit includes a differential mode receiver having a first input coupled to the output of said operational amplifier and a second input coupled to receive said DC reference, said differential mode receiver having an output that is coupled to respective tip and ring amplifiers driving said wireline pair.

5. The apparatus according to claim 1, wherein said subscriber line interface circuit includes a high voltage analog section, which is operative to drive tip and ring conductors of said wireline pair in accordance with communication signals supplied thereto, and a low voltage digitally programmable signal generation and digital signal processing section, that is configured to monitor and program operational characteristics of, and supply said communication signals to said high voltage analog section, said digitally programmable signal generation and digital signal processing section being coupled to provide said DC reference a supplied thereto from said external device.

6. The apparatus according to claim 5, wherein said high voltage analog section includes an input signal receiving unit, that is operative to interface input voice communication signals, supplied from said low voltage digitally programmable signal generation and digital signal processing section, and includes a voice signal path containing a voltage-sense, current-feed circuit to which voice signals are coupled from said low voltage digitally programmable signal generation and digital signal processing section, and a tip/ring amplifier, having respective tip and ring amplifier sections, to which complementary polarity currents representative of voice signal signals are coupled from said voltage-sense, current-feed circuit, and having tip and ring outputs thereof adapted to be coupled to said tip and ring conductors of said wireline pair.

7. The apparatus according to claim 6, wherein said tip and ring amplifier sections of said tip/ring amplifier are coupled to respective tip and ring path loop detectors, that provide outputs representative of sensed tip and ring currents for application to a digitally programmable signal generation and digital signal processing section that controls the operation of said subscriber line interface circuit.

8. A subscriber line interface circuit comprising:

an input signal receiving unit, that is operative to interface input signals, supplied from a digitally programmable signal generation and processing unit;

a multi-mode tip/ring amplifier unit, having tip and ring outputs adapted to be coupled to tip and ring conductors of a subscriber loop pair, and inputs coupled to receive and amplify said input signals, in accordance with the mode of operation of said subscriber line interface circuit;

a sense amplifier coupled to outputs of said tip and ring amplifier sections of said dual mode tip/ring amplifier and being operative to provide a voice signal summation for differential mode voice signals, and mutual cancellation of common mode signals;

an operational amplifier having a first input coupled to receive a DC reference from an external device to which said subscriber line interface circuit is coupled, and a second, opposite polarity, input coupled to receive the output of said sense amplifier, said operational amplifier having an output coupled as an input to said external device; and an AC filter having an input coupled to receive said DC reference, and an output coupled to an input of said sense amplifier, said AC filter having a transfer function that is operative to pass noise components that may be present on said DC reference, but to block the DC component of said DC reference from application to said sense amplifier;

said operational amplifier circuit performing common mode rejection of said noise components that may be present on said DC reference, so that the output of said operational amplifier has substantially reduced noise components which, when coupled to downstream differential mode processing circuitry that is coupled to said DC reference, are effectively canceled.

9. The subscriber line interface circuit according to claim 8, further including a biasing unit, to which power for operating said multi-mode tip/ring amplifier is coupled, and being operative to controllably couple prescribed bias voltages to said tip and ring amplifier sections of said tip/ring amplifier in accordance with the mode of operation of said subscriber line interface circuit.

10. The subscriber line interface circuit according to claim 8, wherein said AC filter comprises a high pass, resistor-capacitor filter, containing a capacitor coupled between a DC reference port to which said DC reference is applied and a node, that is coupled through a resistor to a prescribed voltage terminal, and to an input of a buffer, and an output of which is coupled to said input of said sense amplifier.

11. The subscriber line interface circuit according to claim 8, wherein an output of said sense amplifier is adapted to be coupled through said operational amplifier to an analog feedback monitor port for closing a loop to synthesize the output impedance of said subscriber line interface circuit.

12. The subscriber line interface circuit according to claim 8, wherein said tip and ring amplifier sections of said dual mode tip/ring amplifier are coupled to respective tip and ring path loop detectors, that provide outputs representative of sensed tip and ring currents for application to said digitally programmable signal generation and processing unit.

13. A method for interfacing communication signals with a wireline pair comprising the steps of:

(a) providing a subscriber line interface circuit having an input signal receiving unit, that is operative to interface input signals with a tip/ring amplifier unit, having tip and ring outputs thereof coupled to tip and ring conductors of said wireline pair, and inputs coupled to received amplify said input signals, a sense amplifier coupled to output of said tip and ring amplifier sections of said dual mode tip/ring amplifier and being operative to provide a voice signal summation for differential mode voice signals, and mutual cancellation of common mode signals, and an operational amplifier having a first input coupled to receive a DC reference from an external device to which said subscriber line interface circuit is coupled, and a second, opposite polarity, input coupled to receive the output of said sense amplifier, said operational amplifier having an output coupled as an input to said external device; and (b) coupling an input of an AC filter to said DC reference, and an output to an input of said sense amplifier, said AC filter having a transfer function that is operative to pass to said tip/ring signals and noise components that may be present on said DC reference, but to block said DC reference from application to said sense amplifier, whereby said operational amplifier performs common mode rejection of said noise components that may be present on said DC reference, so that the output of said operational amplifier has substantially reduced noise components which, when coupled to downstream differential mode processing circuitry that is coupled to said DC reference, are effectively canceled.

14. The method according to claim 13, wherein said AC filter comprises a high pass, resistor-capacitor filters containing a capacitor coupled between a DC reference port to which said DC reference is applied and a node, that is coupled through a resistor to a prescribed voltage terminal, and to an input of a buffer, and an output of which is coupled to said input of said sense amplifier.

15. The method according to claim 13, wherein an output of said sense amplifier is adapted to be coupled through said operational amplifier to an analog feedback monitor port for closing a loop to synthesize the output impedance of said subscriber line interface circuit.

16. The method according to claim 13, wherein said tip and ring amplifier sections of said dual mode tip/ring amplifier are coupled to respective tip and ring path loop detectors, that provide outputs representative of sensed tip and ring currents.

* * * * *